(12) United States Patent
Guney et al.

(10) Patent No.: US 10,268,744 B2
(45) Date of Patent: Apr. 23, 2019

(54) SYSTEM FOR MAINTAINING CONSISTENCY ACROSS A DECENTRALIZED DATABASE CLUSTER AND METHOD THEREFOR

(71) Applicant: Walmart Apollo, LLC, Bentonville, AR (US)

(72) Inventors: Ergin Guney, San Francisco, CA (US); Yan Zheng, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 355 days.

(21) Appl. No.: 15/010,183

(22) Filed: Jan. 29, 2016

(65) Prior Publication Data
US 2017/0083598 A1    Mar. 23, 2017

Related U.S. Application Data

(63) Continuation-in-part of application No. 14/861,672, filed on Sep. 22, 2015, now Pat. No. 10,083,201.

(51) Int. Cl.
*G06F 17/30* (2006.01)
*G06F 9/4401* (2018.01)
*G06Q 30/06* (2012.01)

(52) U.S. Cl.
CPC ...... *G06F 17/30578* (2013.01); *G06F 9/4406* (2013.01); *G06F 17/3053* (2013.01);
(Continued)

(58) Field of Classification Search
CPC ......... G06F 17/30578; G06F 17/30867; G06F 17/30545; G06F 17/30554;
(Continued)

(56) References Cited

U.S. PATENT DOCUMENTS 7,809,769 B2   10/2010   Butcher et al.
7,840,662 B1 *  11/2010   Natanzon ............ H04L 67/1097
                                                709/209
(Continued)

OTHER PUBLICATIONS

Cassandra Targett, "Combining Distribution and Replication," https://cwiki.apache.org/confluenced/display/solr/Combining+Distribution+and+Replication, Apache Solr Reference Guide, Apache Software Foundation, Jun. 3, 2013, Los Angeles, CA, USA.

*Primary Examiner* — Greta L Robinson
(74) *Attorney, Agent, or Firm* — Bryan Cave Leighton Paisner LLP

(57) ABSTRACT

A system and method for maintaining consistency across a decentralized database cluster is presented. When a database server receives an index update message, it adds a message to a queue indicating it has received the message and watches an index update node. Once every server in the cluster has added a message to the queue or a timer has expired, it is known that every active database server has received the message. The update can be performed for each server and the changes committed simultaneously. In such a manner, all database servers in the cluster perform an update at approximately the same time. When a database server is unable to complete an update, it enters a fallen behind mode and performs updates more often, as configured in a configuration database. Other embodiments also are disclosed.

25 Claims, 13 Drawing Sheets

(52) U.S. Cl.
CPC .. *G06F 17/30545* (2013.01); *G06F 17/30554* (2013.01); *G06F 17/30584* (2013.01); *G06F 17/30867* (2013.01); *G06Q 30/0625* (2013.01)

(58) Field of Classification Search
CPC .......... G06F 17/30584; G06F 17/3053; G06F 9/4406; G06Q 30/0625
See application file for complete search history.

(56) References Cited

U.S. PATENT DOCUMENTS

| | | | |
|---|---|---|---|
| 8,352,494 B1 | 1/2013 | Badoiu | |
| 9,032,017 B1 | 5/2015 | Singh et al. | |
| 9,740,706 B2 | 8/2017 | Cramer et al. | |
| 9,860,316 B2 | 1/2018 | Shalita et al. | |
| 2001/0037326 A1* | 11/2001 | Bamford | G06F 11/1471 |
| 2004/0024861 A1 | 2/2004 | Coughlin | |
| 2004/0133591 A1* | 7/2004 | Holenstein | G06F 11/2064 |
| 2004/0158549 A1* | 8/2004 | Matena | G06F 11/2097 |
| 2004/0220981 A1 | 11/2004 | Taylor | |
| 2005/0138151 A1 | 6/2005 | Lam et al. | |
| 2006/0101033 A1 | 5/2006 | Hu et al. | |
| 2006/0112135 A1 | 5/2006 | Warshawsky | |
| 2006/0129528 A1 | 6/2006 | Miyamoto et al. | |
| 2009/0037367 A1 | 2/2009 | Wein | |
| 2009/0154420 A1* | 6/2009 | Kim | H04L 41/00 370/331 |
| 2009/0232115 A1* | 9/2009 | Horn | H04L 29/12311 370/338 |
| 2010/0306286 A1* | 12/2010 | Chiu | H04L 67/10 707/827 |
| 2011/0029490 A1* | 2/2011 | Agarwal | G06F 9/467 707/684 |
| 2011/0307541 A1 | 12/2011 | Walsh et al. | |
| 2012/0109892 A1 | 5/2012 | Novik et al. | |
| 2013/0047039 A1 | 2/2013 | Manes et al. | |
| 2013/0173806 A1 | 7/2013 | Newton et al. | |
| 2013/0290249 A1* | 10/2013 | Merriman | G06F 17/30578 707/610 |
| 2014/0012814 A1 | 1/2014 | Bercovici | |
| 2014/0108421 A1 | 4/2014 | Isaacson et al. | |
| 2014/0304393 A1 | 10/2014 | Annamalaisami et al. | |
| 2014/0372484 A1 | 12/2014 | Baker et al. | |
| 2015/0302063 A1 | 10/2015 | Nigam et al. | |
| 2017/0249246 A1 | 8/2017 | Bryant et al. | |

\* cited by examiner

SYSTEM FOR MAINTAINING CONSISTENCY ACROSS A DECENTRALIZED DATABASE CLUSTER AND METHOD THEREFOR

CROSS-REFERENCE TO RELATED APPLICATIONS

This application is a continuation-in-part of U.S. application Ser. No. 14/861,672, filed Sep. 22, 2015, the contents of which are hereby incorporated by this reference.

TECHNICAL FIELD

This disclosure relates generally to computing, and relates more particularly to database systems.

BACKGROUND

In database management systems, data size and volume of a transaction can be limited on a single server. A common approach to solving this problem is to partition a database across multiple servers. Such a technique can be subject to several problems, however, such as performance bottlenecks and troubleshooting difficulties.

BRIEF DESCRIPTION OF THE DRAWINGS

To facilitate further description of the embodiments, the following drawings are provided in which.

Figure 1:
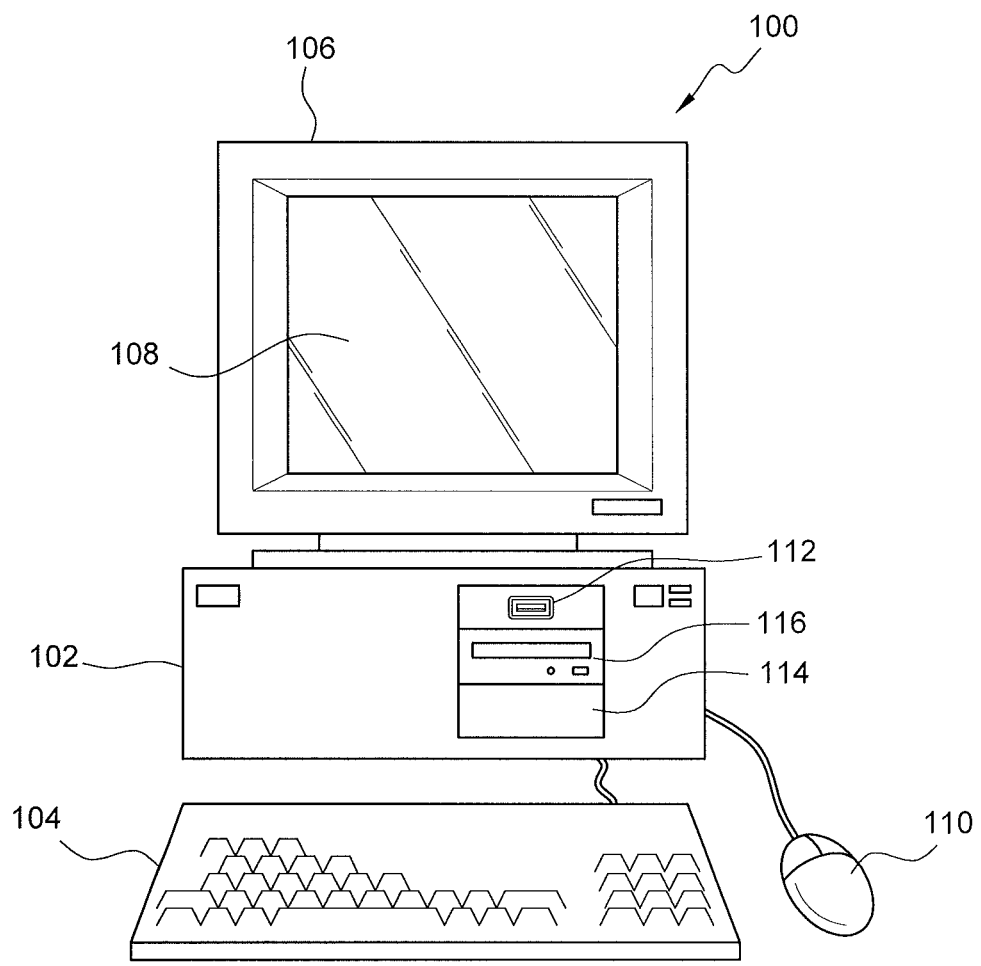
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can comprise: a plurality of database servers each hosting a copy of a database, each database server comprising one or more processing modules and one or more non-transitory storage modules storing computing instructions. The computing instructions can be configured to run on the one or more processing modules and perform acts of: adding a node representing the database server to a list of active database servers; receiving a checkpoint marker message with an associated checkpoint ID; determining if a checkpoint roll call node exists for the associated checkpoint ID; adding a node representing the database server to the checkpoint roll call node; determining if a roll call has expired; and committing an update to the database server.

Some embodiments include a method. The method can comprise: in a database server of a cluster of database servers, adding a node representing a database server to a list of active database servers; receiving a checkpoint marker message with an associated checkpoint ID; determining if a checkpoint roll call node exists for the associated checkpoint ID; adding a node representing the database server to the checkpoint roll call node; determining if a roll call is complete; and committing an update to the database server.

Some embodiments include a method. The method can be executed in a database server of a cluster of database servers. The method can comprise: receiving a first checkpoint marker message with an associated checkpoint ID; determining if a checkpoint roll call node associated with the first checkpoint marker message is still active; and if the checkpoint roll call node is not active, removing the database server from a list of available servers; and leaving a normal mode to enter a fallen behind mode.

Figure 2:
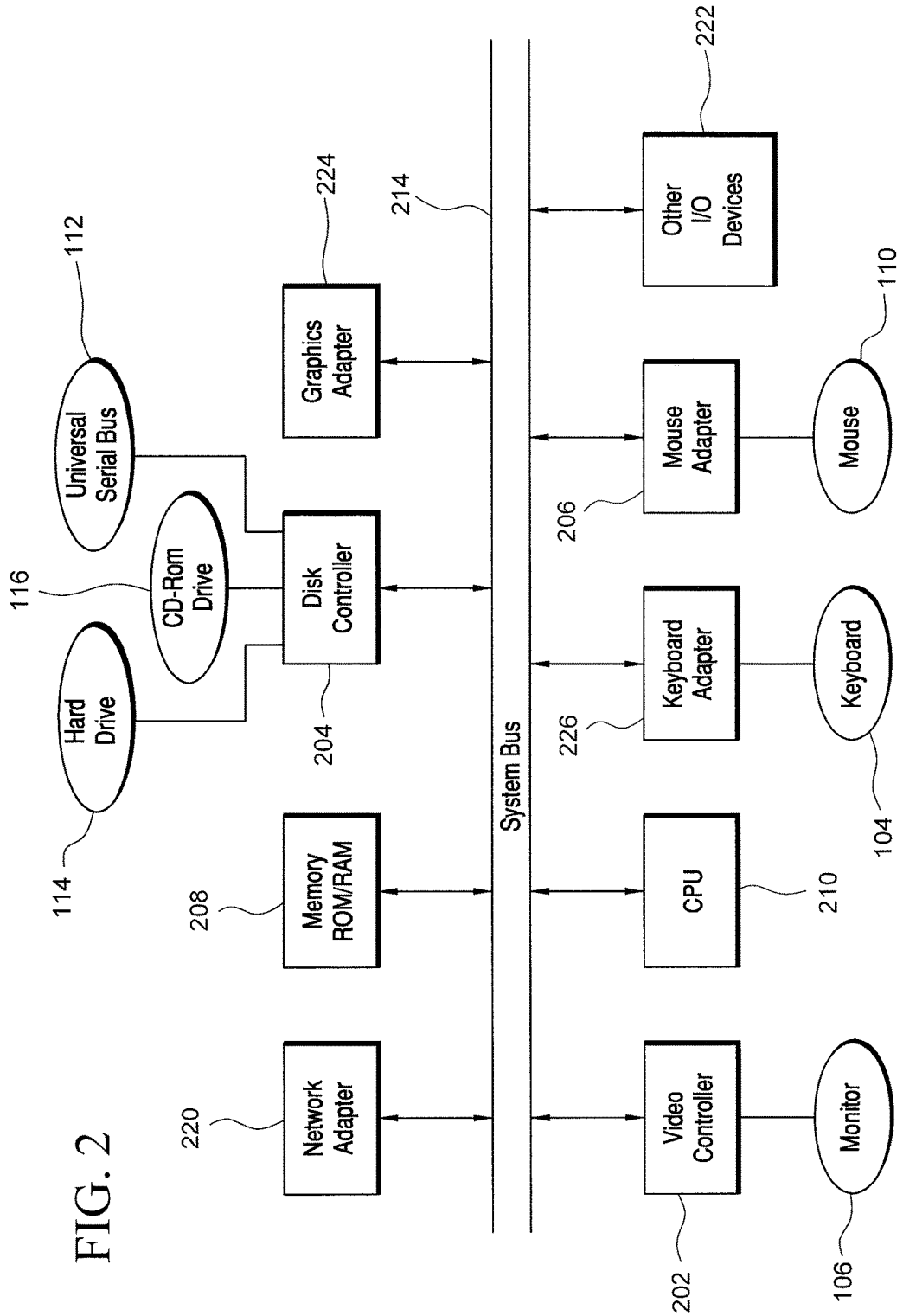
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a drive 114. Drive 114 can be a hard drive that uses spinning magnetic disks to store data or it can be a solid state drive (SSD) that uses a fast, non-volatile memory for storage. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
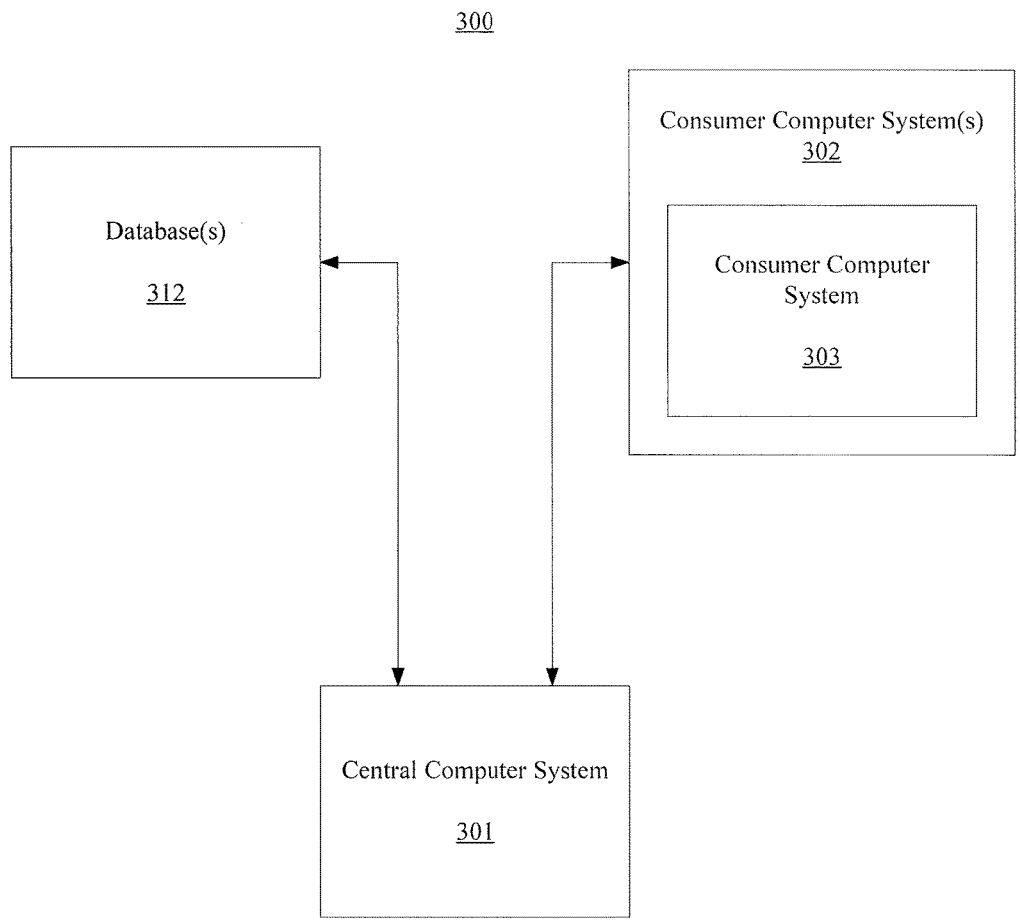
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more predetermined acts performed by the consumer; and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™ and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312, or it can be spread across multiple ones of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer. But in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

A database is an organized collection of data managed by software called a database management system. A database management system ("DBMS") is a computer software application that interacts with users, other applications, and the database to capture and analyze data. A database can be organized in one of a variety of different manners. Typically, a database has one or more tables and each table has one or more columns and one or more rows. Each column has a specific type of data and each row contains data for a single entry. For example, in a product database used in an electronic commerce ("eCommerce") situation, a separate column is used for each type of data, such as price, item name, unique identifier, description, and the like. A row is a set of data for each particular product. An eCommerce database might have multiple tables. For example, there might be a table for customer data and a table for product data. Very large databases are commonly stored on dedicated database servers—computers that are primarily used to access the database, as opposed to general purpose computers.

As databases become increasingly large and the demand on databases increases, the performance of database can become compromised. For example, eCommerce databases can become very large because they store information about every product sold by an eCommerce provider, which can number in the millions for large eCommerce providers. Search engines similarly can have millions of entries in a database. To improve the performance of a database, some database are partitioned. A partition is a division of a database into multiple distinct independent parts. A database is typically partitioned into a cluster of database servers. One method of partitioning is horizontal partitioning, which involves separating a table by placing different rows into different tables. For example, a customer database can be divided into two partitions by ZIP code, with ZIP codes 49999 and below in a first partition and ZIP codes 50000 and above being in a second partition. More than two horizontal partitions can be used.

Another partitioning technique is called sharding. One type of sharding involves placing each horizontal partition of a table onto a different database server. Because the performance of a database is related to a the size of the database, dealing with smaller partitions speeds up the performance of the database. Placing each partition on a separate database server speeds up performance even more, as each individual database server can be set up to deal with only one partition of a database. For example, in a database with 3,000,000 records might be partitioned into three different shards, each with approximately 1,000,000 records. A database with 1,000,000 records will typically perform faster than a database with 3,000,000 records in terms of time required to process a query.

Figure 4:
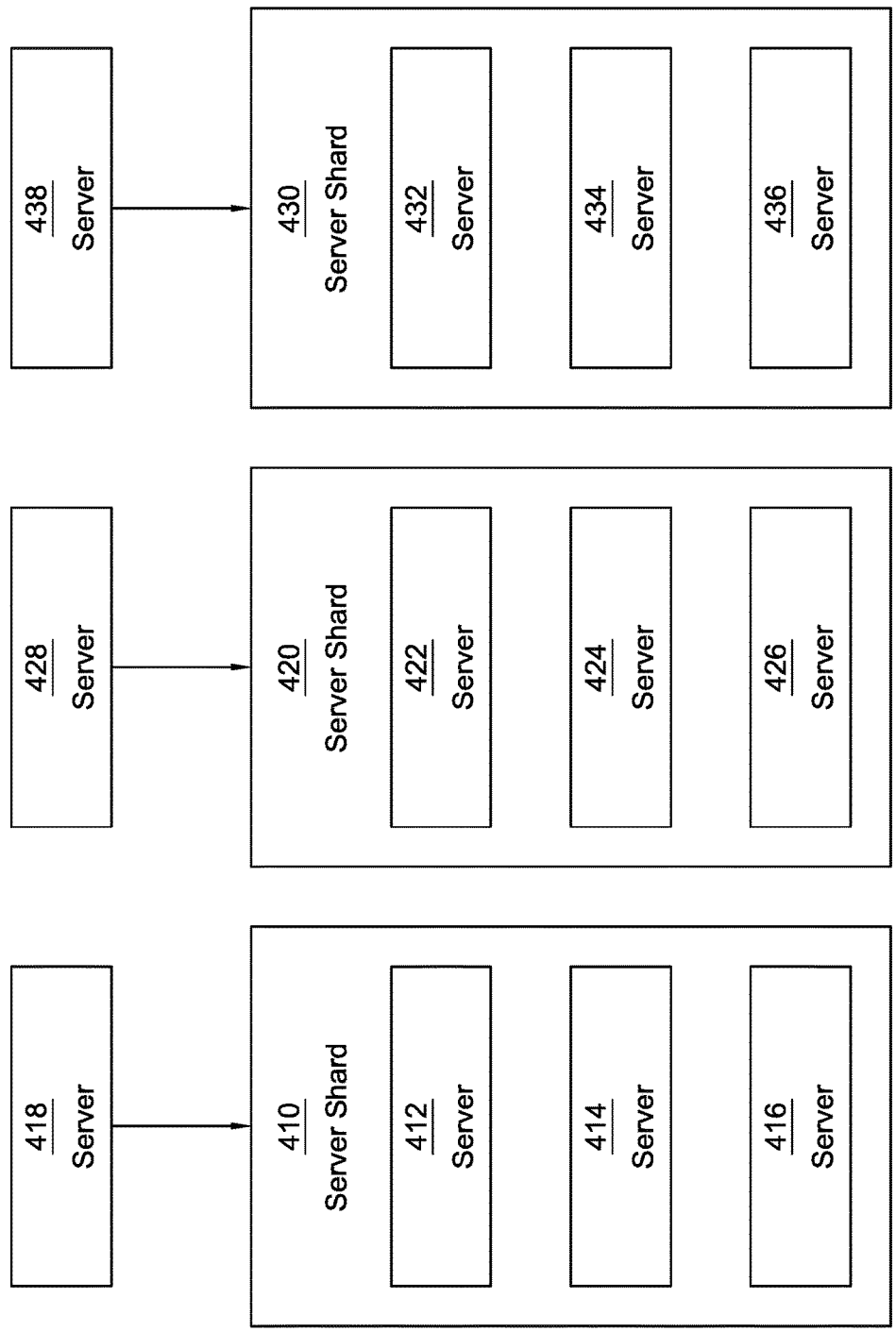
FIG. 4 is a block diagram illustrating a database configuration of the prior art.

FIG. 4 is a block diagram illustrating a sharded database system 400 of the prior art. Sharded database system 400 is a database system that has been partitioned into three different databases. As described above, a large database can be horizontally partitioned into several smaller databases. At an eCommerce provider, the database partitions can be separated in one of a variety of different manners. For example, each product in the database can have a record containing information about the product. These products can be divided such that one-third of the products are in a first shard, one-third of the products are in a second shard, and one-third of the products are in a third shard. Products can be divided into shards by categories, such that electronics are in one shard and clothing is in a second shard. For load-balancing purposes, better performance might occur if the division is random. In other words, one might not desire one of the shards to handle all of the electronics products because those products might be similarly busy at the same time of year. Other types of databases can have other types of partitioning to create shards. For example, a customer database can be partitioned such that customers from Europe are in one database shard, customers from North America are in a second database shard, and customers from Asia are in a third database shard, each shard being housed in its own database server.

To improve performance even more, some database implementations use a cluster containing multiple servers, each server hosting a complete copy of a database (or a complete copy of a database shard). Present in FIG. 4 are shard 410, shard 420, and shard 430. A copy of each of the shards is hosted on multiple servers. Three servers for each shard is are shown in FIG. 4. However, there can be many more than three servers for each shard. Shard 410 is hosted on server 412, server 414, and server 416. Shard 420 is hosted on server 422, server 424, and server 426. Shard 430 is hosted on server 432, server 434, and server 436. In some embodiments, each server hosts a complete copy of the shard in question. For example, the complete database shard 410 is hosted on each of server 412, 414, and 416. By having multiple servers, each with a copy of a database shard, performance is improved. In the embodiment shown in FIG. 4, instead of a single server handling all incoming queries of a database shard, each server handles approximately one-third of the incoming queries. Adding more database servers allows each server to handle a lower proportion of the incoming queries.

In addition, there can be a master database server for each shard. For example, server 418 can be a master database server for shard 410. Server 428 can be a master database server for shard 420. Server 438 can be a master database server for shard 430. In addition to various other functions, master database servers 418, 428, and 438 perform load-balancing functions, dividing actions among the various servers within the shard. For example, when master database server 418 receives an instruction, master database server 418 forwards the instruction to one of the servers in shard 410 (server 412, server 414, and server 416). An exemplary instruction might include a query. A query is initiated on one shard. A query of shard 410 is forwarded to master database server 418 for execution, which uses one of servers 412, 414, or 416 to execute the query. However, a query of only a single shard might be incomplete (depending on how the database is partitioned). Thus, a query being executed by a single shard is typically forwarded to other shards to be executed.

Each server can have one of a variety of different configurations. In some embodiments, rack-mounted computers can be used to serve as servers. In some embodiments, desktop computers can be used to serve as servers. Regardless of the configurations, each server has many (but not necessarily all) of the elements of the computers illustrated in FIGS. 1 and 2.

An inefficiency of the layout described above will now be described in the context of how an incoming instruction (such as a search request) is handled. An incoming instruction is processed by a server. Master database servers 418, 428, and 438 serve several purposes. In some embodiments, master database servers 418, 428, and 438 can pre-process a query. Using business logic and other parameters, the query can be parsed into a form that results in a more optimal search (e.g., dealing with plural terms and singular terms, dealing with synonyms, or dealing with misspelled words). Another important task for master database servers 418, 428, and 438 is to serve as load-balancers.

Load balancing is the distributing of workload across multiple computing resources. For example, if a database receives a number of queries that is below a certain threshold, the database can be operated on a single computer. Large databases and/or databases that process many queries at once would overwhelm a single computer. Load balancing prevents this situation by taking incoming instructions and distributing the instructions across multiple computers. One of the multiple computers can process the incoming instruction. The next incoming instruction is distributed to another computer. In such a manner, a computing cluster can process instructions more quickly. Load balancing also helps to optimize resource use, maximize throughput, minimize response time, avoid overload of any single resource, and increase reliability through redundancy.

Returning to FIG. 4, the incoming query is processed by one of the other servers. In this case, server 412 receives the instruction. The instruction (such as a query) is forwarded to each of shard 410, shard 420, and 430. Although server 412 is in shard 410, server 410 does not necessarily know which shard it belongs to. Therefore, the query is forwarded to master database server 418 to perform a search of shard 410, to master database server 428 to perform a search of shard 420, and to master database server 438 to perform a search of shard 430. The forwarding to each of the master database servers is illustrated via arrows 462, 464, and 466. Each of the master database servers distributes the query to one of the servers in its shard. Thus, master database server 418 distributes the query to one of server 412, server 414, or server 416; master database server 428 distributes the query to one of server 422, server 424, or server 426; master database server 438 distributes the query to one of server 432, server 434, or server 436. Each of the servers to which the query was distributed executes the query. The results of the query from each server is aggregated, sorted, and returned to the requestor (such as a the person who requested the query).

There are several problems with the above-described scenario. First of all, master database servers 418, 428, and 438 can become performance bottlenecks when servicing very high request rates. Second, there can be difficulty in troubleshooting—if one of the servers becomes faulty, it might be difficult to determine which server is faulty because it is not known to which server each instruction is being forwarded by the master database servers. Third, there is unnecessary routing taking place, resulting in lower performance. The unnecessary routing is because server 412 does not know it is in shard 410. Therefore, instead of servicing the query for shard 410 itself, server 412 sends the query to each of master database server 418, master database server 428, and master database server 438 (illustrated via arrows 462, 464, and 466). Each of master database server 418, master database server 428, and master database server 438 in turn have to distribute the query among the other servers within shards 410, 420, and 430, respectively.

Figure 5:
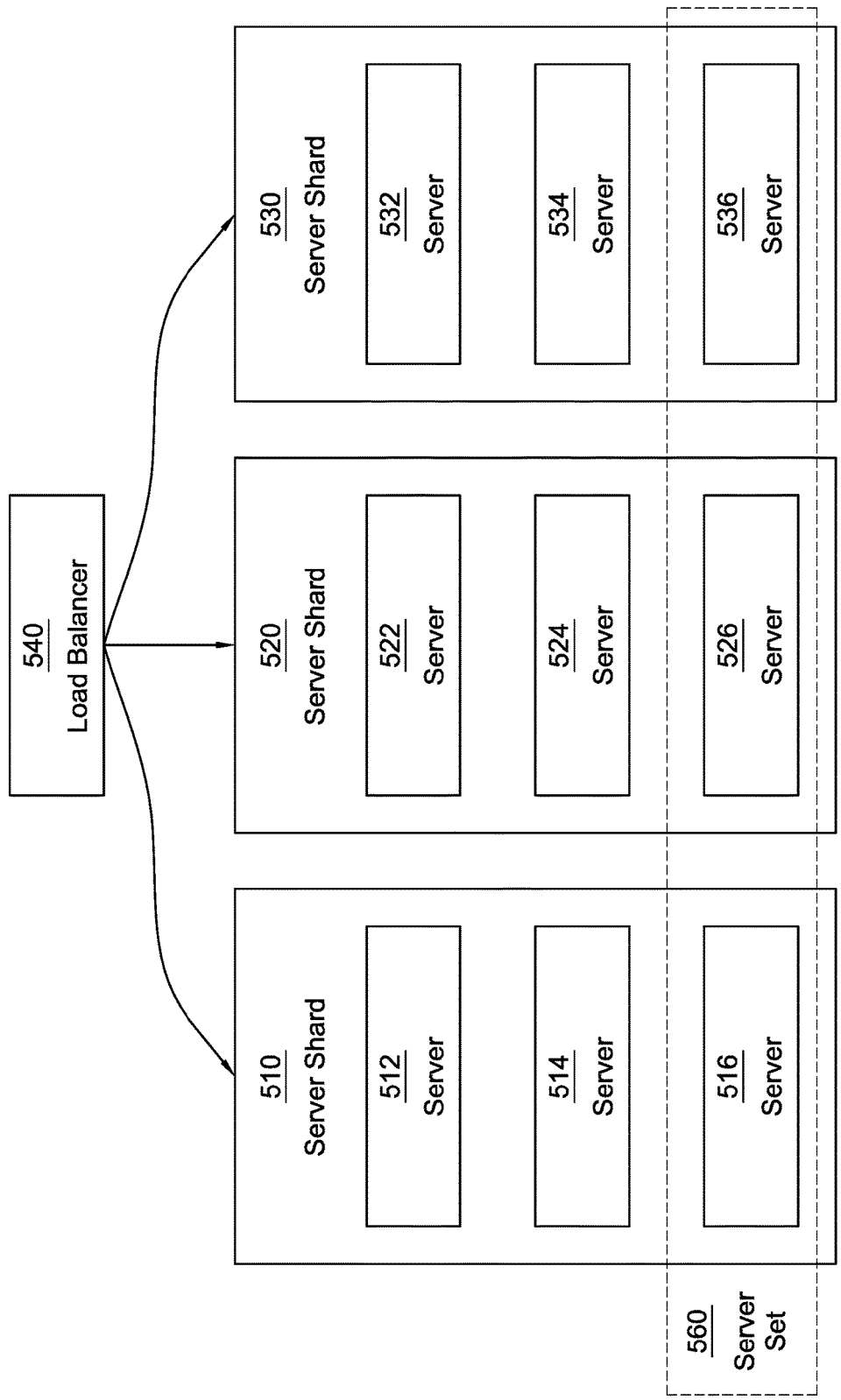
FIG. 5 is a block diagram illustrating a database configuration according to an embodiment.

FIG. 5 is a block diagram illustrating a sharded database system 500 of an embodiment. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules.

Sharded database system 500 comprises three shards: shard 510, shard 520, and shard 530. Illustrated in FIG. 5 are three servers within each shard. Shard 510 has server 512, server 514, and server 516. Shard 520 has server 522, server 524, and server 526. Shard 530 has server 532, server 534, and server 536. It should be understood that more than three servers (or less than three servers) can be used in any shard. However, FIG. 5 illustrates the presence of three servers per shard for ease of illustration. In some embodiments, the below-described operation of the database system might be restricted to read-only usage—that is, writes to database system 500 might occur in a different manner than reads of database system 500.

Also present in FIG. 5 is server set 560. Server set 560 comprises one server from each shard: server 516, server 526, and server 536. The operation of server set 560 will be described in further detail below. Similarly, there is a server set comprising server 514, server 524, and server 534, and there is a server set comprising server 512, server 522, and server 532. While those server sets (and possibly others) exist, they are not illustrated in FIG. 5. Also present in system 500 is a load balancer 540. Although the connections are not illustrated in FIG. 5, load balancer 540 is coupled to each server in system 500 (servers 512, 514, 516, 522, 524, 526, 532, 534, and 536).

In operation, when a user inputs a query into system 500, the query goes to load balancer 540. From load balancer 540, the query gets sent to one of servers 512, 514, 516, 522, 524, 526, 532, 534, and 536. The receiving server then processes the query. As noted above, previously, the receiving server would send the query to further load balancers, which then would distribute the query among the various shards.

In the embodiment shown in FIG. 5, however, the operation is different. In addition to being assigned to a shard such as shard 510, shard 520, or shard 530, each server is also assigned to a server set, such as server set 560. As described above, the server set comprises one server from each shard. Whenever a server within the server set receives an instruction, the instruction undergoes initial processing by the server to result in a query. As discussed above, because the database is partitioned into shards, the query is performed in each of the shards in order to result in a complete search of the database.

Thus, when the query of each shard needs to be performed, the processing server sends the query to the subset of servers that service each shard. However, in this case, the server is configured to send the query to other servers in the server set. For example, in an exemplary situation, the instruction may be initially processed by server 516, which is a member of server set 560. Server 516 is configured to send the resulting query to a member of shard 510, a member of shard 520, and a member of shard 530. But server 516 "knows" that it is a member of shard 510 and is thus configured to perform the query of shard 510. The query intended for shard 520 is processed by a server that is a member of shard 520 and is a member of server set 560— server 526. Similarly, the query intended for shard 530 is processed by server 536. The methods by which each server in server set transmits instructions to other servers in the server set can vary. In general, any method known in the art can be used for such a method. In some embodiments, each server in the server set is programmed with the IP address of each other server in the server set. Thus, when a server is forwarding a query to be processed, one of the queries gets "forwarded" to itself.

One server from each shard is grouped into a server set. A request to any server in any shard will only go to other servers in the same server set. This fact simplifies troubleshooting because we know where the requests go to (the other members of the same server set.)

For example, with reference to FIG. 4, there may be a hypothetical situation in which server 424 experiences problems that result in the slowing of operations performed by server 424. A slow-down of server 424 can become manifest in several different manners. As stated above, an incoming instruction is processed by one of the load balancers 418, 428, or 438. Thereafter, the instruction is forwarded to one of the servers based on which load balancer received the instruction. If load balancer 428 is the one forwarding instructions, the instruction could be forwarded to one of server 422, server 424, or server 426. If the instruction is a query, the query could be forwarded again to each of load balancer 418, load balancer 428, and load balancer 438 to be executed by a server in a particular shard serviced by each load balancer. Thereafter, load balancer 428 will forward the query to one of server 422, server 424, or server 426 for execution.

It can be seen that there are several possible points at which a slowdown of server 424 can manifest itself—when it is called to process an instruction and when it is called to process a query. In addition, it can be difficult to find exactly which server is underperforming. It can be relatively easy to find out that the slowdown occurs from instructions being processed by load balancer 428. In the situation pictured in FIG. 4, where only three servers are in the shard serviced by load balancer 428, it might not be difficult to determine which of the three servers is underperforming. However, there can be implementations where there are hundreds of servers being given instructions from load balancer 428. In such an instance it might be difficult to determine which of the servers is the cause of the slow-down.

Moving ahead to FIG. 5, it can be seen that it will be easier to determine which server is experiencing slow-down issues. There may be a hypothetical situation in which server 526 experiences problems that result in the slowing of operations performed by server 526. Unlike the situation described above, it is easier to determine which server is experiencing the slow-down. As described above, an incoming instruction is received by load balancer 540 and distributed to one of the servers. Any instruction serviced by any server in server set 560 will get serviced by one of the servers in server set. In addition, any query of shard 520 will be performed by server 526.

Therefore, when a slowdown is noticed by a database administrator, the database administrator can examine logs from load balancer 540 to determine which instructions forwarded by load balancer 540 is experiencing slow performance. It will be more easily detected that any instruction forwarded to server set 560 is returning results slower than instructions forwarded to other server sets.

An additional benefit is that a server experiencing slow performance does not affect other server sets. In a conventional scenario, a query could be sent to the server that is experiencing slow performance, thus making all queries potentially affected by the bad machine, thus adversely affecting overall error rates. In the scenario of FIG. 5, only other servers in the same server set are affected by a slow-down of server 526. The other server sets are unaffected. Thus, once a database administrator discovers which server set is experiencing slow operations, the load balancer 540 can be modified such that no instructions go to the affected server set. Thereafter, the database administrator can perform troubleshooting to discover exactly which server in the server set is the cause of the slow performance.

A further benefit is that shard level load balancers are not needed, such as load balancers 418, 428, and 438 of FIG. 4. As illustrated in FIG. 5, only a single load balancer 540 is used in some embodiments.

Figure 6:
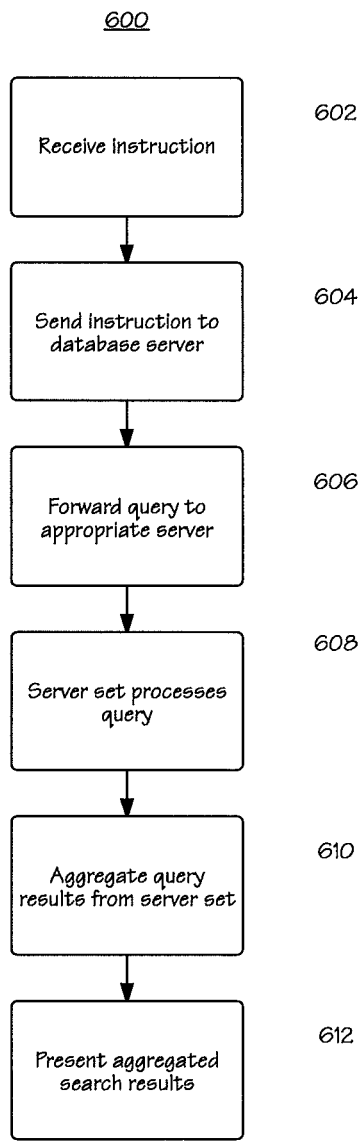
FIG. 6 is a flow chart illustrating the operation of an embodiment.

A flowchart illustrating the method 600 of performing operations on a sharded database system is presented in FIG. 6. Method 600 is merely exemplary and is not limited to the embodiments presented herein. Method 600 can be employed in many different embodiments or examples not specifically depicted or described herein. In some embodiments, the procedures, the processes and/or the activities of method 600 can be performed in the order presented. In other embodiments, the procedures, the processes, and/or the activities of method 600 can be performed in any other suitable order. In still other embodiments, one or more of the procedures, the processes, and/or the activities of method 600 can be combined or skipped. In some embodiments, portions of method 600 can be implemented by computer system 100 (FIG. 1). In some embodiments, method 600 is performed as a part of a read-only search service, where all instructions received are read instructions.

At block 602, a load balancer receives an instruction. In operation, a user can submit a request by a variety of different methods. Common methods include using an app or a web interface to provide instructions. Other methods can include instructions via command-line interface, automated instructions generated in a variety of different manners (e.g., a cell phone camera or automated updating of the database system). Thereafter, the load balancer is configured to send the instruction to a database server (block 604). Load balancing can occur in one of a variety of different methods, both currently existing or those developed in the future. Exemplary methods of load balancing can include round-robin (sending instructions to servers in a predetermined sequence, such that each server only receives a predetermined portion of the incoming instructions) and randomized (sending instructions to a server based in a random order that results in each server receiving a predetermined portion of the incoming instructions, but in a non-predetermined manner).

As described above with respect to FIG. 5, the load balancer is coupled to many different database servers. Each database server handles a shard of a database. In addition, each database server is arranged in server sets where each server set includes one server from each shard of a database. The load balancer send the instruction to a database server selected from one of the shards and from one of the server sets. The database server to which instructions are sent is chosen using load balancing techniques, both currently known in the art or developed in the future.

The database server receives the instruction from the load balancer. Thereafter, the database server processes the instruction. If the instruction is a request to perform a query of the sharded database system, server extracts the query and forwards the query to servers that handle each shard in the database system (block 606). Other database instructions are possible. For example, instructions related to the maintenance of the database system might be received. However, the majority of instructions received in some embodiments are instructions to perform a query of the sharded database.

In some embodiments, each database server is configured to send the query to other database servers in the same server set (as disclosed above with respect to FIG. 5). Each database server in the server set processes the query for the shard in which the database server belongs (block 608). The query results for each database server are aggregated together (block 610). Thereafter, the aggregated search results are presented to the requestor (block 612). Subsequent instructions can be forwarded by the load balancer to other database servers, using load balancing techniques. The presentation of search results can be performed in a variety of different manners. For example, if the query was performed using a web browser (e.g., Google Chrome, Internet Explorer, Safari, Firefox, and the like), the results are forwarded in a manner that can be presented in a web browser. Often, such a presentation of search results involves the dynamic creation of a web page, using common features such as logos and a common layout created using style sheets, tables, and the like. The creation of such a web page is known in art and can be performed in a variety of different manners. In some embodiments, portions of a web page use a web application framework to receive the query. Once the results are aggregated and ready to be presented to the requestor, a web page can contain markup language and/or scripts that receive the query results and display the results in a common format. Other embodiments can be used.

The results would thus be forwarded along with coding appropriate to display results in a browser. If the query was performed using a mobile app, the search results can be presented in a format optimized for mobile viewing using markup language and other techniques known in the art for displaying data using a mobile app.

Figure 7:
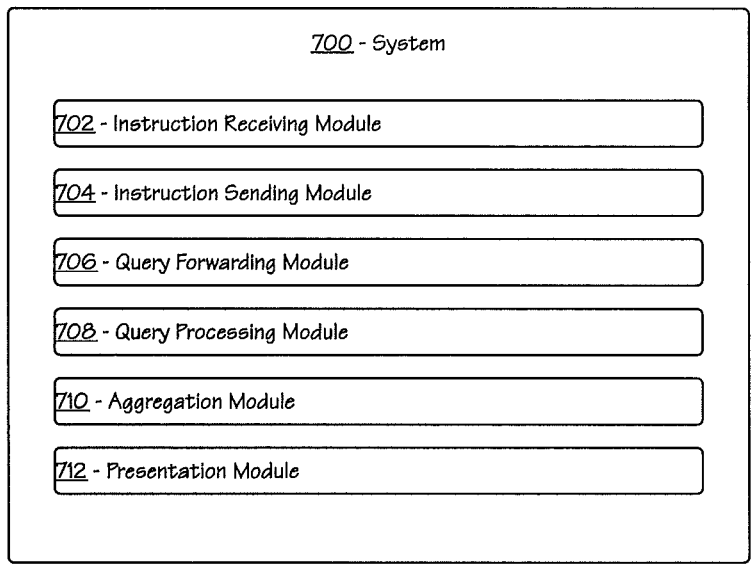
FIG. 7 is a block diagram illustrating a system capable of performing an embodiment.

Turning ahead in the figures, FIG. 7 illustrates a block diagram of a system 700 that is capable of performing disclosed embodiments. System 700 is merely exemplary and is not limited to the embodiments presented herein. System 700 can be employed in many different embodiments or examples not specifically depicted or described herein. In some embodiments, certain elements or modules of system 700 can perform various procedures, processes, and/or acts. In other embodiments, the procedures, processes, and/or acts can be performed by other suitable elements or modules.

In a number of embodiments, system 700 can include instruction receiving module 702. In certain embodiments, instruction receiving module 702 can perform block 602 (FIG. 6) of receiving instructions.

In a number of embodiments, system 700 can include instruction sending module 704. In certain embodiments, instruction sending module 704 can perform block 604 (FIG. 6) of sending the instructions to a database server using load balancing techniques.

System 700 can include query forwarding module 706. In certain embodiments, query forwarding module 706 can perform block 606 (FIG. 6) of forwarding a query to shards in the database system.

System 700 can include query processing module 708. In certain embodiments, query processing module 708 can perform block 608 (FIG. 6) of processing a query.

System 700 can include aggregation module 710. In certain embodiments, aggregation module 710 can perform block 610 (FIG. 6) of receiving navigation inputs from the user.

System 700 can include presentation module 712. In certain embodiments, presentation module 712 can perform block 612 (FIG. 6) of presenting results.

Because multiple servers are present in the various embodiments described above that each have a copy of the same database, it can be desirable to have a method or system configured to ensure that the database and/or index of the database remains up-to-date, without adversely affecting the operation of the database system. A failure to keep the database and/or index up-to-date can result in outdated search results. In an eCommerce environment, outdated information can result in problems such as an incorrect price being displayed, incorrect available quantities displayed, or new items not being displayed. Such problems can result in an unsatisfied customer and/or lost sales. In many current distributed services, the "eventual consistency" model is used. In such a model, all servers in a cluster will converge toward the same state after a certain amount of time. But the individual servers can have a different state from each other before the convergence occurs.

In some embodiments, index contents are kept up to date through the use of a stream of update messages broadcast to all servers in the cluster via a messaging system. In some embodiments, the messaging system can follow a publisher/subscriber model, such as a Kafka cluster.

At its core, the feature relies on three main factors: 1) "Checkpoint marker" messages embedded into the document update stream being broadcast from the messaging system; 2) a coordinated checkpoint "roll call" mechanism using an external data store; and 3) a mechanism for keeping newly made index updates in "pending" state until an explicit commit operation that makes them available to search queries.

The external data store contains several pieces of data including: 1) A list of all search servers that are currently active. This can be accomplished through the use of "ephemeral nodes," which allows any node to remain persistent only as long as the connection to the server that created the node remains alive. The node disappears as soon as the server crashes or shuts down. Thus, only active search servers are listed; 2) One parent node for each checkpoint marker message under which each search server will add a node representing itself, to serve as a roll call; and 3) a checkpoint flag node whose deletion will serve to notify all search servers involved that the related checkpoints roll call has been completed.

Figure 8:
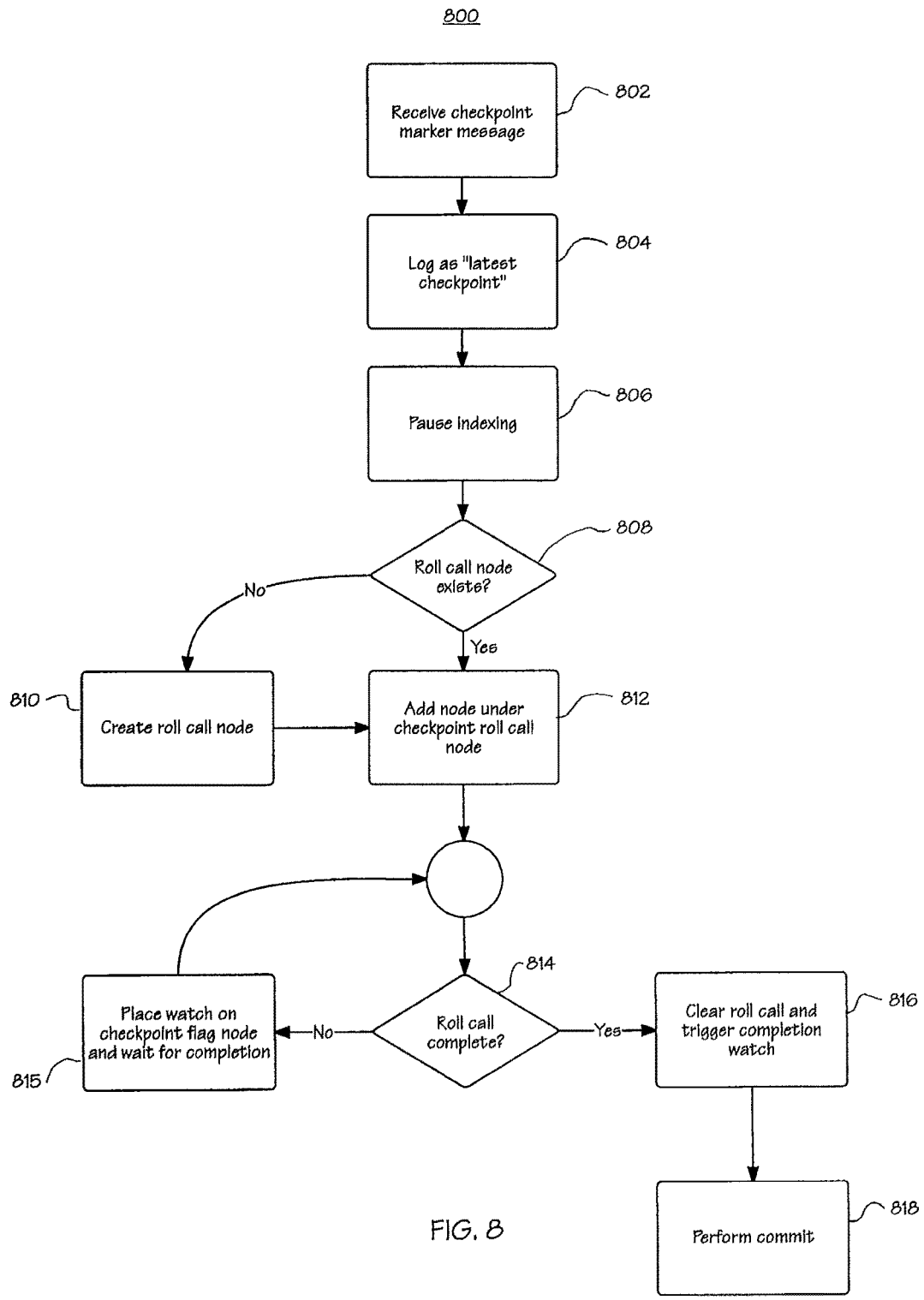
FIG. 8 is a flow chart illustrating the operation of an embodiment.

A flowchart illustrating the method 800 of updating a plurality of servers is presented in FIG. 8. Method 800 is merely exemplary and is not limited to the embodiments presented herein. Method 800 can be employed in many different embodiments or examples not specifically depicted or described herein. In some embodiments, the procedures, the processes and/or the activities of method 800 can be performed in the order presented. In other embodiments, the procedures, the processes, and/or the activities of method 800 can be performed in any other suitable order. In still other embodiments, one or more of the procedures, the processes, and/or the activities of method 800 can be combined or skipped. In some embodiments, portions of method 800 can be implemented by computer system 100 (FIG. 1). In some embodiments, each of the blocks described is specific to a single shard, such that each shard would have its own message updating system.

A server receives a checkpoint marker message (block 802). This checkpoint marker message is logged as the "latest checkpoint." (block 804).

In some embodiments, the system being described is a runtime system—a set of production machines used to service search queries from end users. A "master" database of the information being kept in the runtime system is on a separate subsystem. When a change, addition, or removal is made to the "master" database, the change is propagated to the runtime system so that end users are able to obtain search results that reflect the current "master" database.

There are several different messages that can exist in such a system. If the message is a normal document update message, the index update is performed, but the change is not committed (in other words, a tentative change is not made permanent and the transaction is not finished.) If the message is a checkpoint marker message, operation continues to checkpoint roll call behavior, described below. In some embodiments, when a server receives the checkpoint marker message, it suspends further processing of any messages. The checkpoint marker message has an associated checkpoint ID.

This can be called a checkpoint coordination mode. The checkpoint coordination mode allows the servers in a shard to perform an update without the need for a centralized manager or supervisor machine. While in the checkpoint coordination mode, each server remains in a suspended mode until all of the active servers have checked in. Once all servers check in, changes to a database (such as an index), can be committed and further processing can proceed. The steps are described in further detail below.

The server pauses indexing (block 806). Thereafter, the server checks if a checkpoint roll call parent node has already been created for this checkpoint ID (block 808). A checkpoint roll call node is made for every server in a cluster of servers on the external data store. If a checkpoint roll call node does not already exist, the server creates the checkpoint roll call node and also creates the checkpoint flag node (block 810). Race conditions (where multiple servers are attempting to create a node at the same time) can be avoided through the use of an exclusive lock mechanism. If a checkpoint roll call node already exists, then it is known that another server has already created a checkpoint roll call node and no additional checkpoint roll call node needs to be created.

Thereafter, a node representing the server is added under the checkpoint roll call node (block 812). This block is also performed if a checkpoint roll call node already existed at block 808. The node is used as a part of the roll call process. Each server adds a node to the checkpoint roll call node. Thereafter, it is determined if the roll call is now complete by comparing the entries listed under this checkpoint roll call node and those listed under a list of active servers (block 814). In other words, as each server in a cluster of database servers receives the checkpoint marker message, it adds its node to the checkpoint roll call node. Then it compares the nodes in the checkpoint roll call node are compared to the list of active servers created in block 802. If there are any missing nodes, then it is known that not every server has processed the checkpoint marker message. Race conditions can be avoided through the use of an exclusive lock mechanism that prevents other servers from updating the checkpoint roll call node.

If the roll call is not complete, the server places a watch on the checkpoint flag node for this checkpoint ID so that this server receives a pushed notification when this flag node is deleted (block 815).

If there are no missing nodes from block 814, then the roll call is complete, meaning that all active servers have received the checkpoint marker message and added a node to the checkpoint roll call node. The roll call node is deleted along with all of its child nodes and the checkpoint flag node is also updated (block 816). The update of the checkpoint flag node notifies each server, each of which had placed a watch on the checkpoint flag node at block 815, that the roll call period is over. When each individual server receives notification that the checkpoint flag node has been deleted, it commits all pending index updates and return to normal processing (block 818).

The behavior that emerges from the above described method is that the index state reflected on all servers in the cluster will be up to date as of the same specific point in the document update stream being broadcast by the messaging system. Furthermore, this behavior is achieved without designating any hosts with specialized/supervisory roles.

Figure 9:
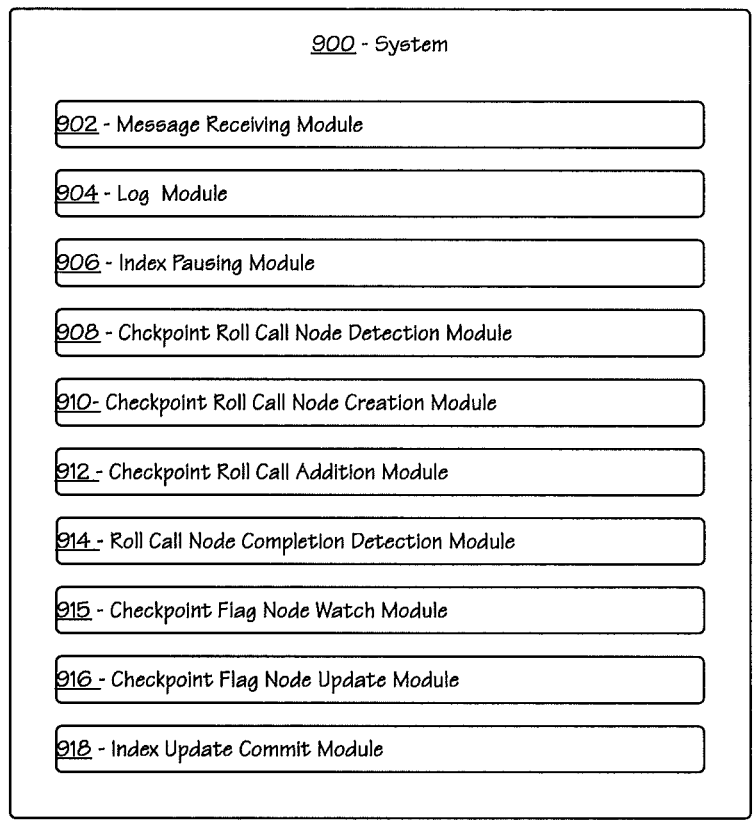
FIG. 9 is a block diagram illustrating a system capable of performing an embodiment.

Turning ahead in the figures, FIG. 9 illustrates a block diagram of a system 900 that is capable of performing disclosed embodiments. System 900 is merely exemplary and is not limited to the embodiments presented herein. System 900 can be employed in many different embodiments or examples not specifically depicted or described herein. In some embodiments, certain elements or modules of system 900 can perform various procedures, processes, and/or acts. In other embodiments, the procedures, processes, and/or acts can be performed by other suitable elements or modules.

In a number of embodiments, system 900 can include message receiving module 902. In certain embodiments, message receiving module 902 can perform block 902 (FIG. 8) of receiving a message.

In a number of embodiments, system 900 can include log module 904. In certain embodiments, log module 904 can perform block 804 (FIG. 8) of logging as "latest checkpoint."

In a number of embodiments, system 900 can include index pausing module 906. In certain embodiments, index pausing module 906 can perform block 806 (FIG. 8) of pausing indexing.

In a number of embodiments, system 900 can include checkpoint roll call node detection module 908. In certain embodiments, checkpoint roll call node detection module 908 can perform block 808 (FIG. 8) of detecting the existence of a checkpoint roll call node.

In a number of embodiments, system 900 can include checkpoint roll call node creation module 910. In certain embodiments, checkpoint roll call node creation module 910 can perform block 810 (FIG. 8) of creating a checkpoint roll call node.

In a number of embodiments, system 900 can include checkpoint roll call addition module 912. In certain embodiments, checkpoint roll call addition module 912 can perform block 812 (FIG. 8) of adding a node under a checkpoint roll call node.

In a number of embodiments, system 900 can include roll call node completion detection module 914. In certain embodiments, roll call node completion detection module 914 can perform block 814 (FIG. 8) of detecting whether the roll call is complete.

In a number of embodiments, system 900 can include checkpoint flag node watch module 915. In certain embodiments, checkpoint flag node watch module 915 can perform block 815 (FIG. 8) of placing a watch on a checkpoint flag node.

In a number of embodiments, system 900 can include checkpoint flag node update module 916. In certain embodiments, checkpoint flag node update module 916 can perform block 816 (FIG. 8) of committing all pending index updates.

In a number of embodiments, system 900 can include index update commit module 918. In certain embodiments, index update commit module 918 can perform block 818 (FIG. 8) of committing all pending index updates.

Another aspect of some embodiments is a method by which queries are allocated in an efficient manner. As described above, a database cluster can have a large number of servers. In some embodiments, there can be dozens, hundreds, or even thousands of servers for each server set. There can be several different methodologies used to select which server receives a query to be processed.

In some embodiments, each server can dynamically select the logic to use when forwarding shard-level search queries to appropriate peers. In its basic implementation, there might be two different sets of routing logic that could be used.

A server set based routing logic is described above. A database cluster will be considered to be broken into a number of server sets, where each server set includes N servers, one for each shard (in a cluster that has N shards). Exemplary layouts of such a setup is described above. The allocation of servers to server sets can be defined based on a deterministic algorithm. In one such algorithm, each server in the database cluster is assigned a unique hostname. The assigning of hostnames can be performed in one of a variety of different manners known in the art. For example, hostnames can be consecutively numbered, or can be assigned otherwise unique names (e.g., using any naming convention now known or developed in the future.) In one embodiment, servers in one shard are given a name followed by a number, with each server being given a unique number. For example, servers in shard A can be called Alpha_01, Alpha_02, Alpha_03, and so on, while servers in shard B can be called Beta_01, Beta_02, Beta_03, and so on. It should be understood that the above naming scheme is merely exemplary and any type of naming system can be used.

Each server is assigned to a server set in one of a variety of known methods. For example, in an embodiment with three different server sets, the first server on the list of servers for each shard is assigned to the first server set, the second server from each shard is assigned to the second server set, the third server from each shard is assigned to the third server set, the fourth server is assigned to the first server set, and so on. In other words, the "Mth" servers in the alphanumerically sorted list of hostnames assigned to each shard will together make up server set M). When performing server set-based routing, when a server needs to call a server from another shard for a shard-level query, it will call a server from the server set that is assigned to that shard.

In round-robin routing logic, when a server is picking another server to call for a shard-level request, it will pick the "next" server that follows the last one called for that same shard from among all servers assigned to that shard (or the very first one on the list, if no call has yet been placed for that shard or if the last call was for the last entry in the list), going by the alphanumerically listed hostname list of all servers currently available that are assigned to that shard. Round-robin routing can be used by a server for a shard-level query when the server in the server set assigned to that shard (which would be the target normally called) is not currently available (e.g., the server is down or is operating too slowly).

For example, there can be a situation where servers 1, 4, 7, and 10 are assigned to shard A, servers 2, 5, 8, and 11 are assigned to shard B, and servers 3, 6, 9, and 12 are assigned to shard C. In server set routing logic, the servers are pre-assigned to a server set. The server set may include servers 1, 2, and 3 for one server set; servers 4, 5, and 6 for a second server set and so on. When server 1 needs to send a query to shard B, it sends the query to the server in the server set that is assigned to shard B, server 2 in this example.

In a round-robin routing logic, all the servers in shard A (servers 1, 4, 7, and 10 in the above example) take turns being the "next" server to process a query for shard A. In other words, the servers in shard A are placed in a first order. All the servers in shard B (servers 2, 5, 8, and 11 in the above example) take turns being the "next" server to process a query for shard B. In other words, the servers in shard B are placed in a second order. Because each shard typically has the same number of servers, in normal operation, round-robin routing logic operates in a similar manner to server set routing logic because the servers in shard B take turns performing requests. So the first request goes to server 2, the second request goes to server 5, and so on. Because the first request (when all servers are operating properly), comes server 1, it will call server 2, while server 4 will call server 5, and so on.

A key difference is the operation when a server cannot be used (e.g., the server is at maximum capacity and can no longer process instructions, or the server is down). For example, there may be a situation where server 5 is inoperable. The first request to shard B goes to server 2. The second request to shard B goes to server 8 because server 5 is not available. The third request to shard B, goes to the next available server, which would be server 11. The fourth request to shard B would be processed by the next available server in shard B, server 2 in this example. The fourth request to shard B would be processed by the next available server in shard B, server 8 in this example. This scheme would proceed, in a round robin format, with servers 2, 8, and 11 taking turns processing queries to shard B. Once server 5 becomes available, it can be added to the round robin as the next available server. In an embodiment using server sets, the forwarding can remain the same if all servers in the server set are active. However, if a server within a server set is not active, then queries that would normally be sent to the now-inactive receiver are processed in a round-robin fashion. In a situation where each shard typically has four servers, one of the servers becoming inoperable can result in each of the other servers in the shard having 25% more work. However, in situations with dozens or hundreds of servers in each shard, the additional work performed by each server when another server in a shard becomes inoperable is relatively small.

Thus, under normal conditions (i.e., when all members of the server set are currently available) any search queries received by one of the servers in a given server set will result in shard-level queries being handed off only to other machines within the same server set. This process aids troubleshooting in problematic cases because the logs of only N machines need to be checked, where N is the number of shards in use, instead of all machines of each shard. For example, if there are 3 different shards, but 99 different servers (33 servers in each shard), one would monitor only 3 different servers to find a server that is having problems, because the problems would be limited to a single server set. Thus, troubleshooting would involve only the servers of the server set.

Furthermore, such a configuration serves to contain some types of failures (e.g., when one machine enters a corrupt state and starts failing all requests, the error counts of only the other servers in the server set will be adversely impacted since they will be the only machines expected to be forwarding shard-level calls to this host, as opposed to a more diffuse increase of error counts across the entire cluster as when shard-level calls to this host could be originating from any server).

In cases where a server set is missing one or more of its members due to a server having problems, the round-robin approach ensures an even distribution of the workload of each missing member across all of the other servers assigned to the same shard. At this stage, if any deterministically picked replacement server from another server set were consistently being used by the members of a given server set as the only replacement for their missing server from the server set, there would be a possibility that some servers could be overloaded by this type of "auxiliary" workload to make up for other missing members (because more than one server set may end up picking the same replacement server X belonging to shard Y as a replacement for their missing server set that belonged to shard Y).

The mechanism consists of the following components: an external data store accessible to all servers in the cluster where an automatically maintained list is stored of currently available servers; and logic at the time of shard-level query handling that decides between the two routing modes, based on the availability of a server from the server set for all existing shards. Also stored in the external data store is the next available server in a cluster. In such a manner, when round-robin operation is used, the instruction is sent to the next available server. Thereafter, the "next available server" is changed to whichever server is next in the chosen scheme.

In some embodiments, the order followed in the round-robin routing option will not "reset" to the beginning of the round-robin list each time the routing logic is switched. The "last called server" information that is part of the round-robin can remain persistent across every mode change between tuple-based and round-robin-based call routing. As a particular server in a server set becomes unavailable and then returns to availability and keeps repeating this, the order followed by the other servers of the server set of this server to call replacement servers from the problematic server's shard will keep continuing "from where it had left off."

In some embodiments, the above-described situation can be extended to include additional information about each server. This information can include performance-related information. For example, an average CPU load or other load metrics for each server can be monitored by means of a central data store. Each operational server can add its own hostname to the list of available servers in the data store to reflect its availability. In addition, numeric values representing the monitored metrics also can be written to the central data store. The central data store can be accessed by any server in the cluster. When a load of a server becomes higher than a first threshold level, the server can be "skipped" such that another server in the shard is selected to execute the next query. In some embodiments, the first threshold level can be the same as the second threshold level.

As described above, in some embodiments, the point at which all servers in the cluster commit all their pending changes is coordinated through a mechanism that relies on specialized "marker messages" that are injected into the update stream at predefined intervals. These marker messages do not represent an update to any content, but serve as a trigger for coordinated behavior across all servers.

The servers can be configured to perform a commit operation upon receiving "every Kth" marker message. For example, when markers are injected into the update stream after every five update messages, configuring the commits to happen at every 10th marker will mean that each commit will add 50 updates to the database/index contents.) To ensure that all servers in a cluster of servers commit at the same set of markers, the logic that decides whether a given marker message should trigger a commit operation will be based on an ID number for each marker message that will be monotonically increasing (189, 190, 191, 192, . . . ). In such a situation, the rule can be that only those markers whose ID number is fully divisible by K should trigger commits. In other words, when K is set to 5, commits will happen at markers ID 185, 190, 195, 200, 205, etc. This can be expressed mathematically as the update occurring when marker ID mod K=0.

The rate at which content updates are performed can be controlled in a variety of different manners. Controlling the rate should be done in a responsive and lightweight manner, allowing rate changes to happen quickly and without any service interruption. There are two exemplary methods of controlling the rate of update processing, automatic and manual.

In an automatic variation, the rate can be changed in response to the success of each server in keeping up with the update performance of the rest of the servers in the cluster. When a server "falls behind" the point in the update stream where the most up-to-date servers in the cluster are currently processing, the server will automatically and temporarily switch to processing updates at a higher "catch-up" rate until it reaches parity with the servers that are farther ahead. This method and the concept of "falling behind" is explained in further detail below.

Figure 10:
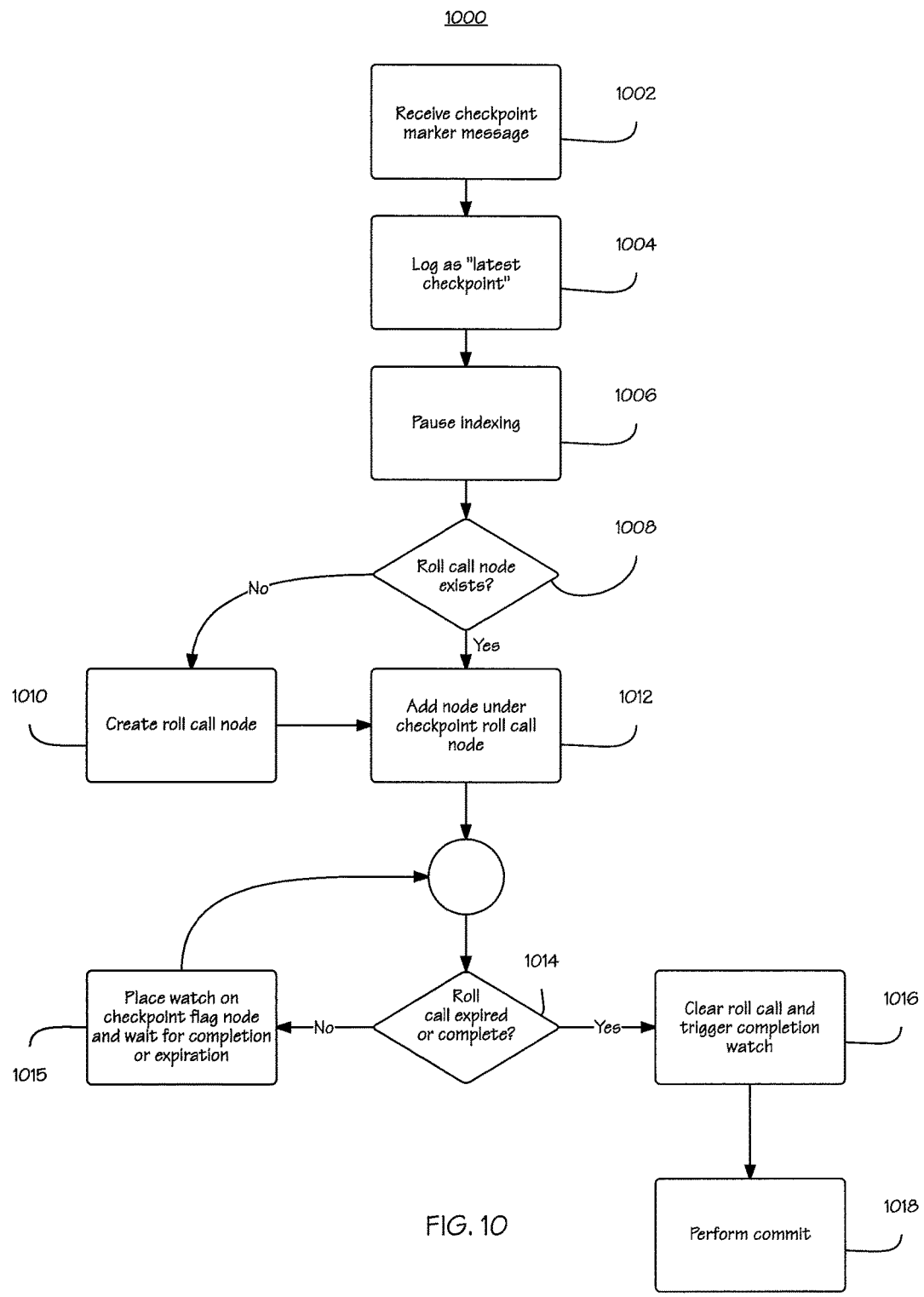
FIG. 10 is a flow chart illustrating the operation of an embodiment.

A flowchart illustrating the method 1000 of updating a plurality of servers is presented in FIG. 10. Method 1000 is merely exemplary and is not limited to the embodiments presented herein. Method 1000 can be employed in many different embodiments or examples not specifically depicted or described herein. In some embodiments, the procedures, the processes and/or the activities of method 1000 can be performed in the order presented. In other embodiments, the procedures, the processes, and/or the activities of method 1000 can be performed in any other suitable order. In still other embodiments, one or more of the procedures, the processes, and/or the activities of method 1000 can be combined or skipped. In some embodiments, portions of method 1000 can be implemented by computer system 100 (FIG. 1). In some embodiments, each of the blocks described is specific to a single shard, such that each shard would have its own message updating system.

Method 1000 builds upon method 800 from FIG. 8. A server receives a checkpoint marker message (block 1002). This checkpoint marker message is logged as the "latest checkpoint" (block 1004).

In some embodiments, the system being described is a runtime system—a set of production machines used to service search queries from end users. A "master" database of the information being kept in the runtime system is on a separate subsystem. When a change, addition, or removal is made to the "master" database, the change is propagated to the runtime system so that end users are able to obtain search results that reflect the current "master" database.

There are several different messages that can exist in such a system. If the message is a normal document update message, the index update is performed, but the change is not committed (in other words, a tentative change is not made permanent and the transaction is not finished.) If the message is a checkpoint marker message, operation continues to checkpoint roll call behavior, described below. In some embodiments, when a server receives the checkpoint marker message, it suspends further processing of any messages. The checkpoint marker message has an associated checkpoint ID.

This situation can be called a checkpoint coordination mode. The checkpoint coordination mode allows the servers in a shard to perform an update without the need for a centralized manager or supervisor machine. While in the checkpoint coordination mode, each server remains in a suspended mode until all of the active servers have checked in. Once all servers check in, changes to a database (such as an index), can be committed, and further processing can proceed. The steps are described in further detail below.

The server pauses indexing (block 1006). Thereafter, the server checks if a checkpoint roll call node has already been created for this checkpoint ID (block 1008). A checkpoint roll call node is made for every server in a cluster of servers on the external data store. If a checkpoint roll call node does not already exist, the server creates the checkpoint roll call node and also creates the checkpoint flag node (block 1010). Race conditions (where multiple servers are attempting to create a node at the same time) can be avoided through the use of an exclusive lock mechanism. If a checkpoint roll call node already exists, then it is known that another server has already created a checkpoint roll call node, and no additional checkpoint roll call node needs to be created.

In some embodiments, the checkpoint roll call node includes a time limit. The time of creation of the checkpoint roll call node can be noted along with a duration of how long the checkpoint roll call will be active. In some embodiments, there can be a default duration for a checkpoint roll call. In some embodiments, the duration of each checkpoint roll call can be set individually.

Thereafter, a node representing the server is added under the checkpoint roll call node (block 1012). This block also is performed if a checkpoint roll call node already existed at block 1008. The node is used as a part of the roll call process. Each server adds a node to the checkpoint roll call node.

At block 1014, in addition to comparing the entries listed under this checkpoint roll call node and those listed under a list of active servers, the expiration of the time limit is checked. In addition, the entries listed under the checkpoint roll call node can be compared to those listed under a list of active servers.

In other words, as each server in a cluster of database servers receives the checkpoint marker message, it adds its node to the checkpoint roll call node. Then it compares the nodes in the checkpoint roll call node to the list of active servers created in block 1002. If there are any missing nodes, then it is known that not every server has processed the checkpoint marker message. Race conditions can be avoided through the use of an exclusive lock mechanism that prevents other servers from updating the checkpoint roll call node.

If the roll call is not complete, the server places a watch on the checkpoint flag node for this checkpoint ID so that this server receives a pushed notification when this flag node is deleted or expired (block 1015).

If there are no missing nodes from block 1014, or if the time limit has expired, then the roll call is complete. The roll call node is deleted along with all of its child nodes, and the checkpoint flag node is also updated (block 1016). The update of the checkpoint flag node notifies each server, each of which had placed a watch on the checkpoint flag node at block 1015, that the roll call period is over. In cases where not all active servers in the cluster join a given commit roll call before the expiration of the time limit, the servers in the roll call can behave as if the roll call is completed anyway and proceed with block 1016, continuing with a commit operation and moving on to subsequent updates without waiting for any lagging servers. Block 1016 also can involve maintaining a list of each roll call, each associated with a unique identifier. The list might include a completion timestamp for each roll call.

When each individual server receives notification that the checkpoint flag node has been deleted, it commits all pending index updates and returns to normal processing (block 1018).

In some embodiments, a roll call will be considered complete based on the presence in the roll call list of all servers that are currently on an "available servers" list that is dynamically maintained in a common data store, as opposed to a list of all known servers in the cluster of servers. In some embodiments, when a server detects that it has fallen behind, it will take itself off of this "available hosts" list, so that it does not hold back each subsequent roll call of the remaining hosts for the duration of the roll call timeout limit every time. Thereafter, when a server detects that it has caught up with the most recent ongoing roll call and leaves fallen-behind state, it will re-add its name to this available servers list so that the other servers begin to expect the presence of this server in each roll call once again.

In a manual variation, rate changes can be performed by a person managing the cluster. These rate changes will (potentially) update both the applicable "normal" update rate and the higher "catch-up" rate. These kinds of changes can take effect in real time. This variation will be explained in further detail below.

Figure 11:
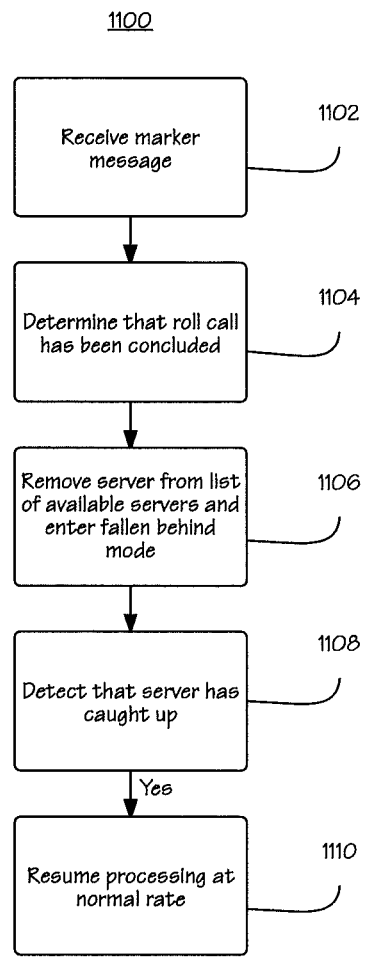
FIG. 11 is a flow chart illustrating the operation of an embodiment.

In some embodiments, an individual server will switch itself to "fallen-behind state" if it has missed a roll call. A flowchart illustrating a method 1100 of entering a fall-behind mode is presented in FIG. 11. Method 1100 is merely exemplary and is not limited to the embodiments presented herein. Method 1100 can be employed in many different embodiments or examples not specifically depicted or described herein. In some embodiments, the procedures, the processes and/or the activities of method 1100 can be performed in the order presented. In other embodiments, the procedures, the processes, and/or the activities of method 1100 can be performed in any other suitable order. In still other embodiments, one or more of the procedures, the processes, and/or the activities of method 1100 can be combined or skipped. In some embodiments, portions of method 1100 can be implemented by computer system 110 (FIG. 1). In some embodiments, each of the blocks described is specific to a single shard, such that each shard would have its own message updating system.

A server receives a marker message (block 1102). After checking the central data store for the roll call associated with that marker's unique identifier, the server discovers that the roll call is logged as one that has already been concluded (block 1104). The server then enters "fallen-behind" mode and removes itself from a list of available servers (block 1106).

Each server in a cluster of servers is configured to retrieve changes from the queue of update messages at rates defined in terms of number of updates per unit amount of time (e.g., "updates per second"). In practice, the actual interval at which updates are retrieved and processed can be configured independently (e.g., "once every five seconds"). In effect, the number of updates that are pulled from the message queue and processed by each server at each update interval will be a product of these two settings. Thus, if the updates-per-second setting is 10 and the update interval is 5 seconds, there will be (up to) 50 updates pulled from the message queue and processed at each update interval, as long as there are updates to be processed.

In some embodiments, there is a configuration database (or other similar data store) that is accessible to all servers in the cluster. The values of the configuration parameters related to this system will be stored in the configuration database. The values stored in the configuration database can include: the number of updates per unit amount of time, when in a normal state; the number of updates per unit amount of time, when in a fallen-behind state; the update interval; and the count of marker messages after which a commit operation should be performed (the value of K in the "do a commit at every Kth marker" logic). In some embodiments, the number of updates per unit of time can be greater in the "fallen-behind" state than it is in the "normal" state. Thus, while the server has "fallen-behind," it processes updates more quickly in an effort to "catch up" to the other servers in the cluster.

A server will change itself to "normal state" (i.e., consider itself as having "caught up") when it receives a marker message while it was in fallen-behind state and, upon checking the data store for the roll call associated with that marker's serial number, detects that this roll call is not yet concluded (block 1108). When this happens, the server will return to participating in roll calls, join this roll call, and revert to processing updates at the "normal" rate (block 1110).

In addition to storing the configuration parameters above, the configuration database also can store a standalone "latest update timestamp" value, indicating the time at which a change was made to any one of these configuration parameters. Any time one or more of the configuration parameters are changed, this timestamp will be updated to the current time.

In some embodiments, during their update cycle, rather than operating with statically defined configuration parameters (or ones that are read from disk at start-up time), each server will check the "latest update timestamp" on this database at every update interval. Each server will compare this timestamp to the latest one at which it had read from the configuration database new values for the parameters. If no configuration values had yet been read (i.e., if the latest read timestamp for this server is blank) or if the latest timestamp for which the server had read new configuration values from the database is the same as the current "latest update timestamp", no changes to any setting will be made. If the "latest update timestamp" currently on the configuration database is newer, then the server will read from the database the new values for all the configuration parameters listed above and put them into effect. It also will update its internally remembered latest update timestamp to this new one.

The end result of this setup is the following: (1) the servers in the cluster will apply the "automatic variation" to their own updates rates when they enter a "fallen behind state" in order to try and stay in lock step when processing the flow of incoming content updates; and (2) changes can be made to the cluster's update rate by merely altering the values in the configuration database, which will take effect in the very next update cycle (typically just a few seconds away).

Figure 12:
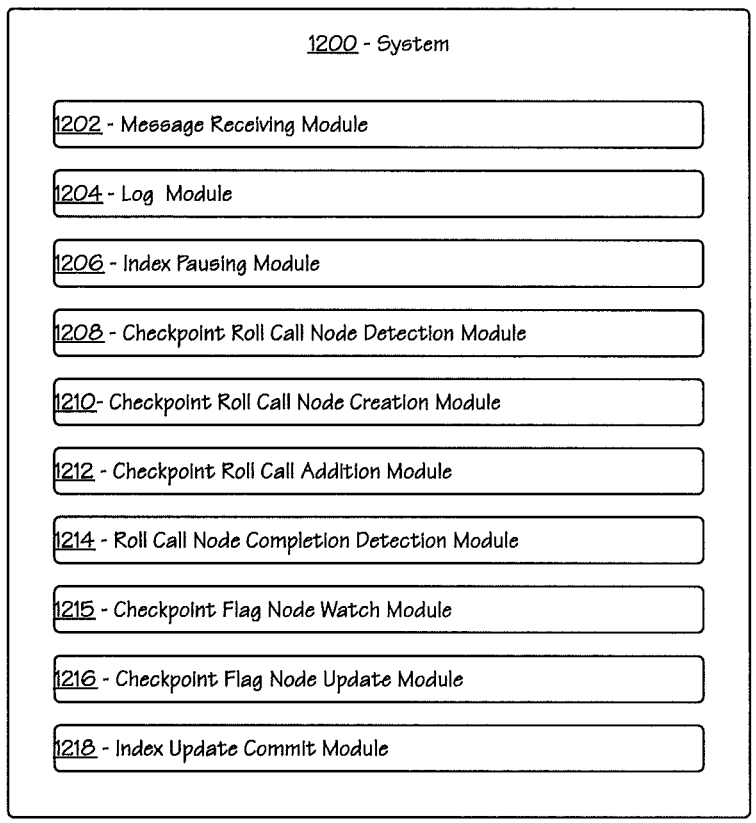
FIG. 12 is a block diagram illustrating a system capable of performing an embodiment.

Turning ahead in the figures, FIG. 12 illustrates a block diagram of a system 1200 that is capable of performing disclosed embodiments. System 1200 is merely exemplary and is not limited to the embodiments presented herein. System 1200 can be employed in many different embodiments or examples not specifically depicted or described herein. In some embodiments, certain elements or modules of system 1200 can perform various procedures, processes, and/or acts. In other embodiments, the procedures, processes, and/or acts can be performed by other suitable elements or modules.

In a number of embodiments, system 1200 can include message receiving module 1202. In certain embodiments, message receiving module 1202 can perform block 1002 (FIG. 10) of receiving a message.

In a number of embodiments, system 1200 can include log module 1204. In certain embodiments, log module 1204 can perform block 1004 (FIG. 10) of logging as "latest checkpoint."

In a number of embodiments, system 1200 can include index pausing module 1206. In certain embodiments, index pausing module 1206 can perform block 1006 (FIG. 10) of pausing indexing.

In a number of embodiments, system 1200 can include checkpoint roll call node detection module 1208. In certain embodiments, checkpoint roll call node detection module 1208 can perform block 1008 (FIG. 10) of detecting the existence of a checkpoint roll call node.

In a number of embodiments, system 1200 can include checkpoint roll call node creation module 1210. In certain embodiments, checkpoint roll call node creation module 1210 can perform block 1010 (FIG. 10) of creating a checkpoint roll call node.

In a number of embodiments, system 1200 can include checkpoint roll call addition module 1212. In certain embodiments, checkpoint roll call addition module 1212 can perform block 1012 (FIG. 10) of adding a node under a checkpoint roll call node.

In a number of embodiments, system 1200 can include roll call node time out/completion detection module 1214. In certain embodiments, roll call node completion detection module 1214 can perform block 1014 (FIG. 10) of detecting whether the roll call is complete or has timed out.

In a number of embodiments, system 1200 can include checkpoint flag node watch module 1215. In certain embodiments, checkpoint flag node watch module 1215 can perform block 1015 (FIG. 10) of placing a watch on a checkpoint flag node.

In a number of embodiments, system 1200 can include checkpoint flag node update module 1216. In certain embodiments, checkpoint flag node update module 1216 can perform block 1016 (FIG. 10) of committing all pending index updates.

In a number of embodiments, system 1200 can include index update commit module 1218. In certain embodiments, index update commit module 1218 can perform block 1018 (FIG. 10) of committing all pending index updates.

Figure 13:
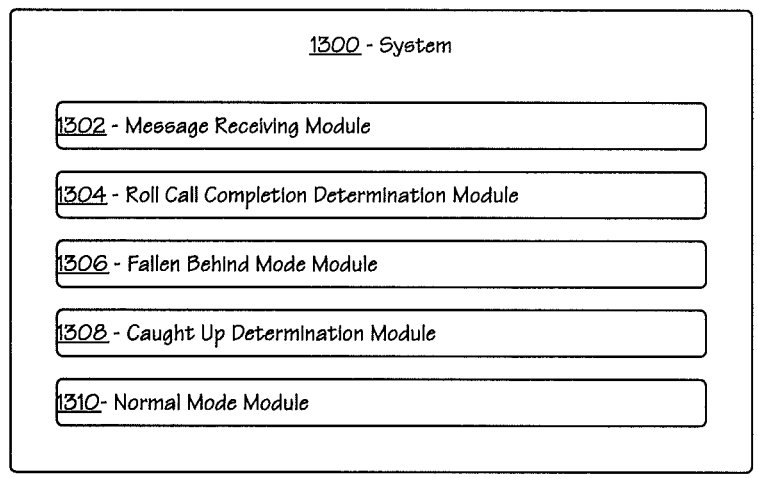
FIG. 13 is a block diagram illustrating a system capable of performing an embodiment.

Turning ahead in the figures, FIG. 13 illustrates a block diagram of a system 1300 that is capable of performing disclosed embodiments. System 1300 is merely exemplary and is not limited to the embodiments presented herein. System 1300 can be employed in many different embodiments or examples not specifically depicted or described herein. In some embodiments, certain elements or modules of system 1300 can perform various procedures, processes, and/or acts. In other embodiments, the procedures, processes, and/or acts can be performed by other suitable elements or modules.

In a number of embodiments, system 1300 can include message receiving module 1302. In certain embodiments, message receiving module 1302 can perform block 1102 (FIG. 11) of receiving a marker message.

In a number of embodiments, system 1300 can include roll call completion determination module 1304. In certain embodiments, roll call completion determination module 1304 can perform block 1104 (FIG. 11) of determining that roll call has completed.

In a number of embodiments, system 1300 can include fallen behind mode module 1306. In certain embodiments, mode changing module 1306 can perform block 1106 (FIG. 11) of changing modes to a fallen behind mode and removing itself from a list of available servers.

In a number of embodiments, system 1300 can include caught up determination module 1308. In certain embodiments, caught up determination module 1308 can perform block 1108 (FIG. 11) of determining if the server has caught up.

In a number of embodiments, system 1300 can include normal mode module 1310. In certain embodiments, normal mode module 1310 can perform block 1110 (FIG. 11) of changing modes to a normal mode.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-13 can be modified, and that the foregoing discussion of certain of these embodiments does not necessarily represent a complete description of all possible embodiments. For example, one or more of the procedures, processes, or activities of FIGS. 1-13 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
a plurality of database servers each hosting a copy of a database, each database server comprising one or more processing modules and one or more non-transitory storage modules storing computing instructions configured to run on the one or more processing modules and perform acts of:
adding a node representing a database server to a list of active database servers;
receiving a checkpoint marker message with an associated checkpoint ID, wherein the checkpoint marker message and the associated checkpoint ID are embedded in a document update message;
determining when a checkpoint roll call node exists for the associated checkpoint ID;
when the checkpoint roll call node exists for the associated checkpoint ID, adding a database server node representing the database server to the checkpoint roll call node;
determining when a roll call has expired; and
after the roll call has expired and after the database server node is added to the checkpoint roll call node, committing an update to the database server.

2. The system of claim 1, wherein:
determining when the checkpoint roll call node exists for the associated checkpoint ID further comprises:
creating the checkpoint roll call node when the checkpoint roll call node does not exist; and
creating a checkpoint flag node.

3. The system of claim 2, wherein the computing instructions are further configured to perform an act of:
placing a watch on the checkpoint flag node.

4. The system of claim 3, wherein:
determining when the roll call has expired further comprises:
comparing a checkpoint roll call node expiration time with a current time; and
updating the checkpoint flag node when the checkpoint roll call node expiration time is earlier than the current time.

5. The system of claim 1, wherein the computing instructions are further configured to perform acts of:
pausing execution of database instructions after receiving the checkpoint marker message with the associated checkpoint ID; and
resuming the execution of the database instructions after committing the update to the database server.

6. The system of claim 1, wherein the database contains a shard of a larger database.

7. The system of claim 1, wherein the computing instructions are further configured to perform an act of:
removing the database server from the list of active database servers when the database server becomes inactive.

8. The system of claim 1, wherein:
the database contains a shard of a larger database;
determining when the checkpoint roll call node exists for the associated checkpoint ID further comprises:
creating the checkpoint roll call node when the checkpoint roll call node does not exist; and
creating a checkpoint flag node;
determining when the roll call has expired further comprises:
comparing nodes belonging to the checkpoint roll call node to nodes belonging to the list of active database servers; and
updating the checkpoint flag node when there are no nodes missing from the checkpoint roll call node;
determining when the roll call has expired further comprises:
receiving a notification that the checkpoint flag node has been updated; and
the computing instructions are further configured to perform acts of:
pausing execution of instructions after receiving the checkpoint marker message with the associated checkpoint ID;
resuming the execution of the instructions after committing the update to the database server;
removing the database server from the list of active database servers when the database server becomes inactive; and
placing a watch on the checkpoint flag node.

9. The system of claim 1, wherein:
the checkpoint marker message causes the database server to pause processing of other messages until after a roll call of the list of available database servers is completed.

10. A method comprising:
in a database server of a cluster of database servers:
adding a node representing the database server to a list of active database servers;
receiving a checkpoint marker message with an associated checkpoint ID, wherein the checkpoint marker message and the associated checkpoint ID are embedded in a document update message;
determining when a checkpoint roll call node exists for the associated checkpoint ID;
when the checkpoint roll call node exists for the associated checkpoint ID, adding a database server node representing the database server to the checkpoint roll call node;
determining when a roll call is complete; and
after the roll call has expired and after the database server node is added to the checkpoint roll call node, committing an update to the database server.

11. The method of claim 10 wherein:
determining when the checkpoint roll call node exists for the associated checkpoint ID further comprises:
creating the checkpoint roll call node when the checkpoint roll call node does not exist; and
creating a checkpoint flag node.

12. The method of claim 11 further comprising:
placing a watch on the checkpoint flag node.

13. The method of claim 12, wherein:
determining when the roll call is complete further comprises:
comparing nodes belonging to the checkpoint roll call node to nodes belonging to the list of active database servers; and updating the checkpoint flag node when there are no nodes missing from the checkpoint roll call node.

14. The method of claim 10, wherein:
the checkpoint marker message causes the database server to pause processing of other messages until after a roll call of the list of available database servers is completed.

15. A method comprising:
receiving a first checkpoint marker message with an associated checkpoint ID, wherein the first checkpoint marker message and the associated checkpoint ID are embedded in a document update message;
determining when a checkpoint roll call node associated with the first checkpoint marker message is still active; and
when the checkpoint roll call node is not active:
  removing a database server from a list of available servers; and
  leaving a normal mode to enter a fallen behind mode.

16. The method of claim 15 further comprising:
detecting that the database server has caught up to a cluster of database servers; and
after the database server has caught up to the cluster of database servers, leaving the fallen behind mode to enter the normal mode.

17. The method of claim 16, wherein:
entering the fallen behind mode comprises updating the database server at a higher rate than a rate in the normal mode.

18. The method of claim 17, wherein:
updating the database server at the higher rate comprises accessing a configuration database to determine the higher rate.

19. The method of claim 18, wherein:
the configuration database comprises information regarding a normal update rate for the normal mode, a fallen behind update rate for the fallen behind mode, and an update interval.

20. The method of claim 19, wherein:
the configuration database further comprises a count of marker messages; and
the update interval is configured to indicate that an update is to occur when a calculation of count mod update interval is equal to zero.

21. The method of 15, wherein:
the first checkpoint marker message comprises a timestamp indicating a time during which the first checkpoint marker message was completed; and
the method further comprises:
  detecting that the database server has caught up to a cluster of database servers by:
    comparing the timestamp with a current time to determine when the first checkpoint marker message was completed prior to the current time; and
    leaving the fallen behind mode to enter the normal mode when the first checkpoint marker message was not completed prior to the current time.

22. The method of claim 15 further comprising:
detecting that the database server has caught up to a cluster of database servers, wherein:
  the first checkpoint marker message comprises a timestamp indicating a time during which the first checkpoint marker message was completed;
  entering the fallen behind mode comprises updating the database server at a higher rate than a rate in the normal mode;
  updating the database server at the higher rate comprises accessing a configuration database to determine the higher rate;
  the configuration database comprises information regarding a normal update rate for the normal mode, a fallen behind update rate for the fallen behind mode, and an update interval;
  the configuration database further comprises a count of marker messages;
  the update interval is configured to indicate that an update is to occur when a calculation of count mod update interval is equal to zero; and
  detecting that the database server has caught up to the cluster of database servers comprises:
    comparing the timestamp with a current time value to determine when the first checkpoint marker message was completed prior to a current time; and
    leaving the fallen behind mode to enter the normal mode when the first checkpoint marker message was not completed prior to the current time.

23. The method of claim 15, wherein:
the first checkpoint marker message causes the database server to pause processing of other messages until after a roll call of the list of available database servers is completed.

24. A system comprising:
one or more processors; and
one or more non-transitory computer-readable storage devices storing computing instructions configured to run on the one or more processors and perform acts of:
  receiving a first checkpoint marker message with an associated checkpoint ID, wherein the first checkpoint marker message and the associated checkpoint ID are embedded in a document update message;
  determining when a checkpoint roll call node associated with the first checkpoint marker message is still active; and
  when the checkpoint roll call node is not active:
    removing a database server from a list of available database servers; and
    leaving a normal mode to enter a fallen behind mode.

25. The system of claim 24, wherein:
the first checkpoint marker message causes the database server to pause processing of other messages until after a roll call of the list of available database servers is completed.

* * * * *